United States Patent [19]
Johnson

[11] Patent Number: 5,709,295
[45] Date of Patent: Jan. 20, 1998

[54] COIN OPERATED AUTOMOBILE TIRE INFLATOR ENCLOSURE

[76] Inventor: Oriz Wickline Johnson, 7086 Butterwood Dr., Cincinnati, Ohio 45241

[21] Appl. No.: 606,222

[22] Filed: Feb. 26, 1996

[51] Int. Cl.[6] .................................................. G07F 17/06
[52] U.S. Cl. .................................. 194/350; 194/904
[58] Field of Search ............................ 194/242, 350, 194/904; 222/3; 141/197

[56] References Cited

U.S. PATENT DOCUMENTS

| | | | |
|---|---|---|---|
| 1,427,450 | 8/1922 | Ewald | 194/904 X |
| 3,208,574 | 9/1965 | Anson | 141/197 X |
| 4,037,700 | 7/1977 | Heraty | 194/350 |
| 4,289,225 | 9/1981 | Scholta | 194/904 X |
| 4,754,519 | 7/1988 | Duran et al. | 194/904 X |

Primary Examiner—F. J. Bartuska

[57] ABSTRACT

A coin-operated automobile tire inflator apparatus encompassing a weather/vandal resistant enclosure topped with customer-attract strobe light, containing compression device with vibration free suspension, inflation pressure regulator, hose retractor reel and vandal-proof coin vault embedded in said enclosure re-inforced concrete mounting base, said base housing vertical traffic guard post with work area flood light.

9 Claims, 4 Drawing Sheets

COIN OPERATED AUTOMOBILE TIRE INFLATOR ENCLOSURE

BACKGROUND OF THE INVENTION

Coincident with the energy crisis of 1973, gasoline service stations across the nation began to curtail traditional service station services, i.e. checking oil, washing windows and checking tire pressure even to the extent of resorting to self-serv gas pumps.

Eventually into this amenities-free environment came a new device, to wit, a self-contained, self-service automobile tire inflator, generally coin operated, complete with its own compressor, hose, tire gage, coin acceptor, coin storage box and electronic controls, all enclosed in a heavy gage steel casing about the size of a breadbox, which was hoped to be vandal free. Not so!

By nature the tire inflators are mounted out-of-doors, night and day, year around leaving them vulnerable certainly to weather, and in spite of best efforts, to vandalism and robbery. There have been a number of heroic efforts to thwart the thieves including one of the more elaborate: a block of concrete enclosing a money vault into which coins drop through a tube from the tire inflator mounted on a steel post emerging up from the concrete block, which does indeed successfully preclude coin theft as well as theft of the inflator itself, which occasionally occurs. The cost and awkwardness of this arrangement however, is virtually prohibitive.

Theft of compressors and other internal devices from the enclosure is virtually unknown so minimum security of the machine section is all that is required, primarily to keep kids away from electrical circuits. It is in fact better that the section be fairly easily breeched by any serious vandal so as to preclude more expensive wrecking bar damage. The primary focus of the anti-theft security in this proposed configuration, the coin vault, is submitted as virtually impregnable, wrecking bar or no.

The enclosure device submitted in this application was originally filed as Patent Office Disclosure Document No.359034 dated Aug. 3, 1994. Since that time refinements in the concept have been made, the most notable: the enclosure/base hinge rather than a swivel technique. Also, placing the hose reel on a horizontal rather than vertical axis solved several problems. The addition of conventional operation lights and the totally unique strobe and working area flood light are niceties. While intended but not shown in the 1994 version, the guard post is now obviously incorporated as an integral component of the vault base. The concept, now as comprehensive, as economical valid and as practically functional as can be imagined, is herewith submitted for patent.

SUMMARY OF THE INVENTION

The preferred embodiment encompasses a stainless steel dome-shaped top and cylindrical machine section enclosure mounted on a re-inforced concrete mounting base containing a steel coin vault and a traffic guard post. The machine section in the order of 14 inches in diameter and approximately 32 inches tall including the dome top, without lights. The concrete base is oblong, approximately 24 inches wide by 42 inches long by 10 inches high, for a total apparatus height of 42 inches.

The vertical enclosure is smooth and unblemished, intentionally and purposefully devoid of any vandalism-inviting panels or openings save the 1 inch airhose outlet.

The compressor, and the electrical controls located on the underside of the dome, are serviced with the hinged dome unlocked and tilted back. The compressor may be electrically disconnected and it and its suspension support easily lifted off its pins and out of the enclosure for a quick change. The internal air hose reel and coin vault are accessed by unlocking and tilting the entire enclosure back to reveal the reel in the bottom of the machine section, and the steel vault with primary locking mechanism, below in the concrete base.

In addition to theft prevention, my invention provides virtually perfect weather protection through the use of corrosion resistant stainless steel, elimination of all openings and panels, the use of an "O" ring gasket, and enlightened geometry.

Lastly, the device practices self-merchandizing by incorporating a strobe "attract" light on its top and a convenience flood light at the top of the guard post to illuminate the working area for the user during night operation.

While the preferred embodiment to be described hereinafter in some detail is that configuration most likely to be employed by the tire inflator industry, there are several possible variations which are claimed to fall within the scope of this invention. For instance, the enclosure may easily be made square, rectangular or other multi-sided shape. The "dome" can be virtually any shape so to fit the enclosure.

Moreover, the enclosure may be made taller to "stack" additional functions, to wit, while less secure and therefore less desirable, the enclosure can be lengthened to cheaply accommodate an internal coin box with lockable access panel to preclude the need for concrete vault base; or to accommodate a second reel for water hose; a vacuum blower and tank; or a fragrance dispenser reservoir and pump.

The controls can easily incorporate a keyboard in lieu of coin acceptor or a ticket dispenser for retail locations preferring these features, or any combination of the above. All these optional functions to be controlled by a "function selector" switch and the air function coin acceptor and timing device.

It is certainly possible, but deemed less desirable, to have any number of access panels, each of which may well invite vandalism. It is the more sophisticated design that precludes these panels while still enabling service accessibility.

The ceramic airhose coupling plays an important safety function not performed by any machine existing today which utilize steel braided air hose. Any electrically hot machine not properly grounded conveys this hot condition through the steel braided hose to the metal gage. When the user has the gage and handle in grasp and inserts a coin, the ungrounded circuit may be fatal, particularly in rainy weather. The ceramic dielectric coupling isolates the hose from the metal enclosure and any errant electrical discharge. Additionally, an extremely sensitive "ground fault" circuit breaker installed upstream of all electrical devices and controls further safeguards users from possible dangerous shock.

DESCRIPTION OF THE DRAWINGS

FIG. 3A-1: Elevation of 3A—3A section of enclosure showing lights, compressor and suspension, pressure regulator, hose reel and hinge-lock arrangements for top cover.

FIG. 3A-2: Elevation of 3A—3A section of mounting base showing hinge-lock arrangement for bottom of enclosure, coin vault, coin box, vault lock, electric power circuit breaker, and anchoring bolts.

PREFERRED EMBODIMENT

Figure 1:
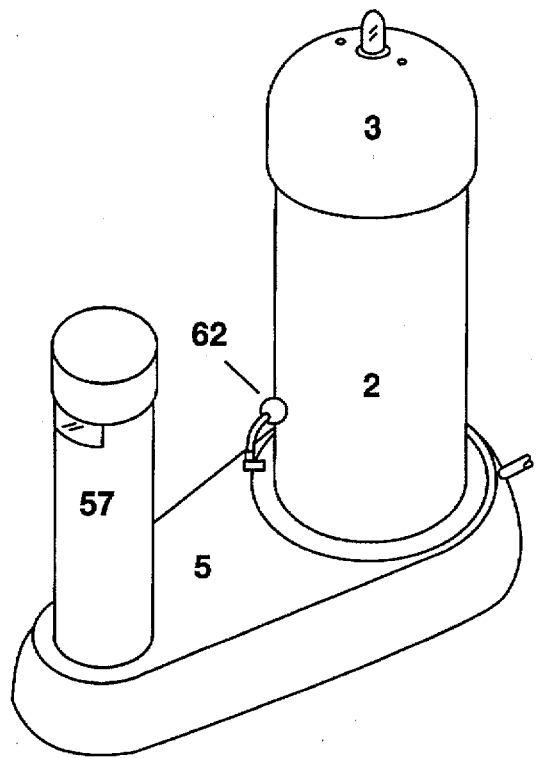
FIG. 1: Cabinet oblique of the apparatus in its entirety.
Figure 2:
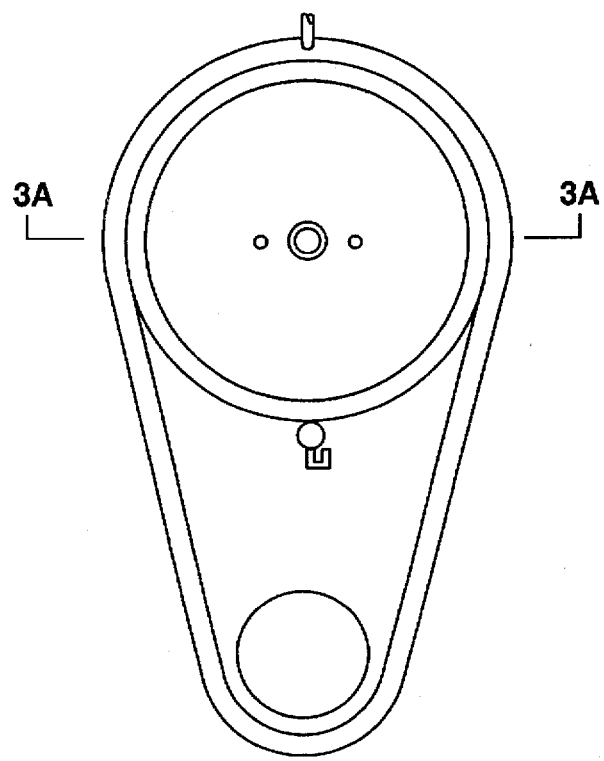
FIG. 2: Plan view of the apparatus in its entirety showing 3A—3A section index.

FIG. 3A-A:

Dome cap 1 is attached to cylindrical machine section 2 by hinge 3 and diametrically opposed lock 4. "Power On" light 1A, "In Use" light 1B, and strobe "attract" light 1C are positioned on the dome with the commensurate controls and wiring circuit located on the underside of the dome.

Air compressor B is connected to suspension rod 9 and lifting handle 10 via screws 11. A hole in each end of suspension rod 9 mounts over vertical pins 12 on internal horizontal flange 13 and is vibration isolated by rubber pillows 14. The compressor hangs down freely from rod 9 and may be easily lifted out of enclosure by grasping lifting handle 10 for quick change if compressor replacement is required, as it frequently is.

Coins inserted in slot 15 of coin acceptor, slide down coin chase 16 to switch trip wire 17, which energizes compressor and starts timing cycle. If coins are undersized, to wit, pennies, nickels, dimes and slugs, they drop through opening 18, not shown, in underside of coin chase 16 to exit out slot 19. Valid coins exit coin acceptor after tripping switch wire 17 and drop into vertical coin coin chute 20 to coin vault below in concrete base.

User sets desired tire pressure on pressure regulator 21 which in turn sets spring tension of regulator relief valve to open if desired pressure is exceeded. Air exiting the relief valve activates a whistle 21A alerting the user that the pressure has been met. (It is equally valid to dispense with the pressure regulator and use a gaged dispenser at the user end of the air hose.) Short hose 22 connects pressure regulator to air compressor and short hose 23 to hose reel 24. Hose reel and retractor spring 25 are mounted to inside wall of enclosure by support members 26. Short hose member 27, fitted with male-to-female dielectric coupling 2B is sufficiently long to extend from reel to outside machine section when fully extended, to enable primary airhose, not shown, to be changed without having to open the enclosure. Ball-type retractor stop, 62 FIG. 1, positioned near end of hose prevents hose reel retractor spring pulling hose entirely into enclosure, said ball-type retractor stop also serving as weather seal of enclosure hose outlet hole when hose not in use.

Electrical power cord 29 enters the concrete base 5 via conduit stub 30 and into "ground fault" circuit breaker 30A, to then run up the side of the enclosure 2 to coin counter/timer device 31 and thence to compressor, lights and other controls. Power cord flex loop 29A provides slack to enable enclosure to open on hinge 6.

FIG. 3A-B:

Pre-poured concrete base 5 is positioned at location site on existing concrete, tarmac or, if necessary, on specially poured concrete pier 31. With base in place, masonry holes are drilled and lead anchors 32 and 33 set thru holes in steel vault bottom plate 38 and bottom of concrete base 5.

Hardened steel bolts 39 and 40 inserted through said holes in steel bottom plate into said lead anchors to pull steel bottom plate 38 and concrete base 5 down fixedly in place when bolts are tightened.

Figures 1, 3A:
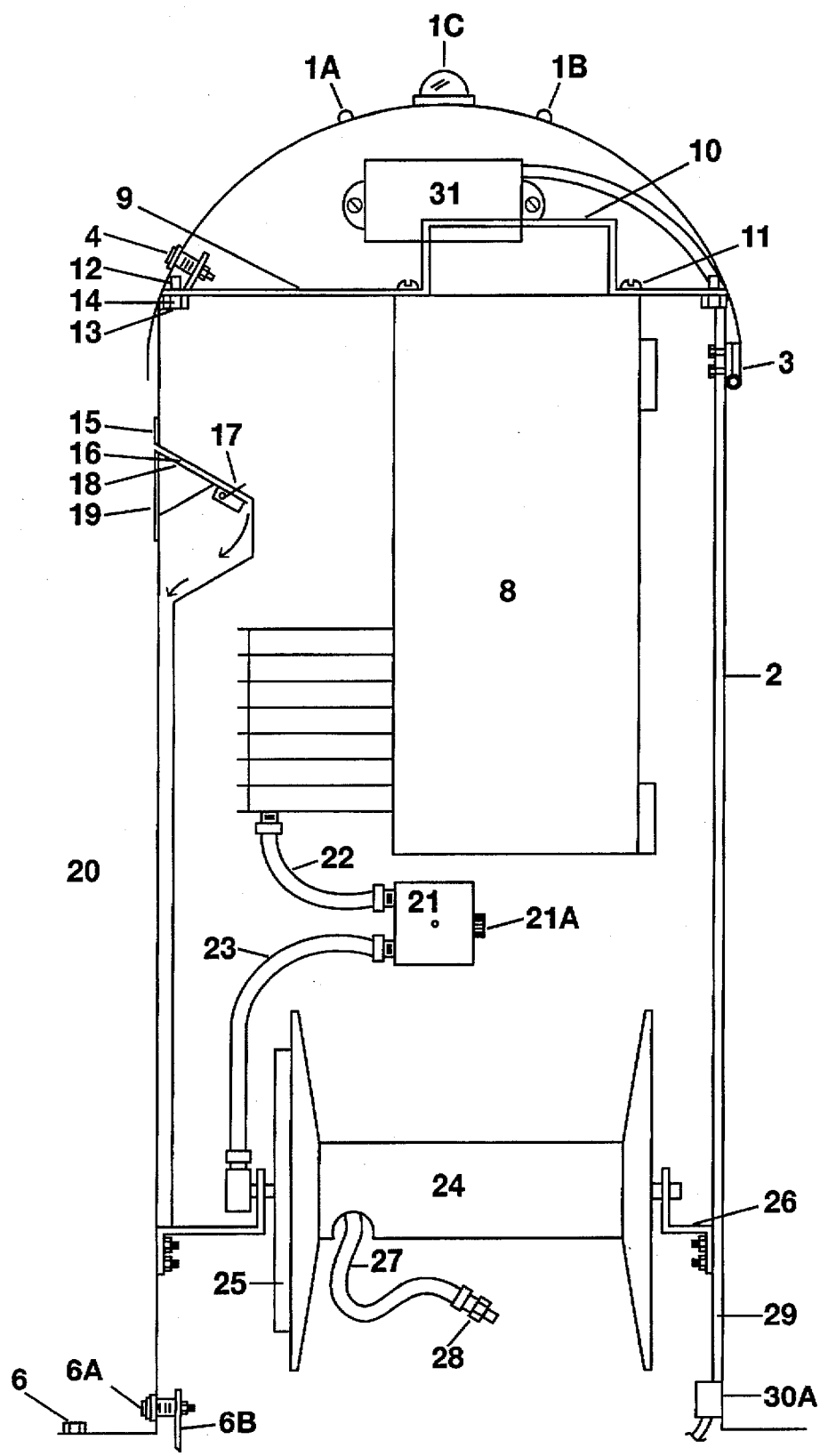
Figures 2, 3A:
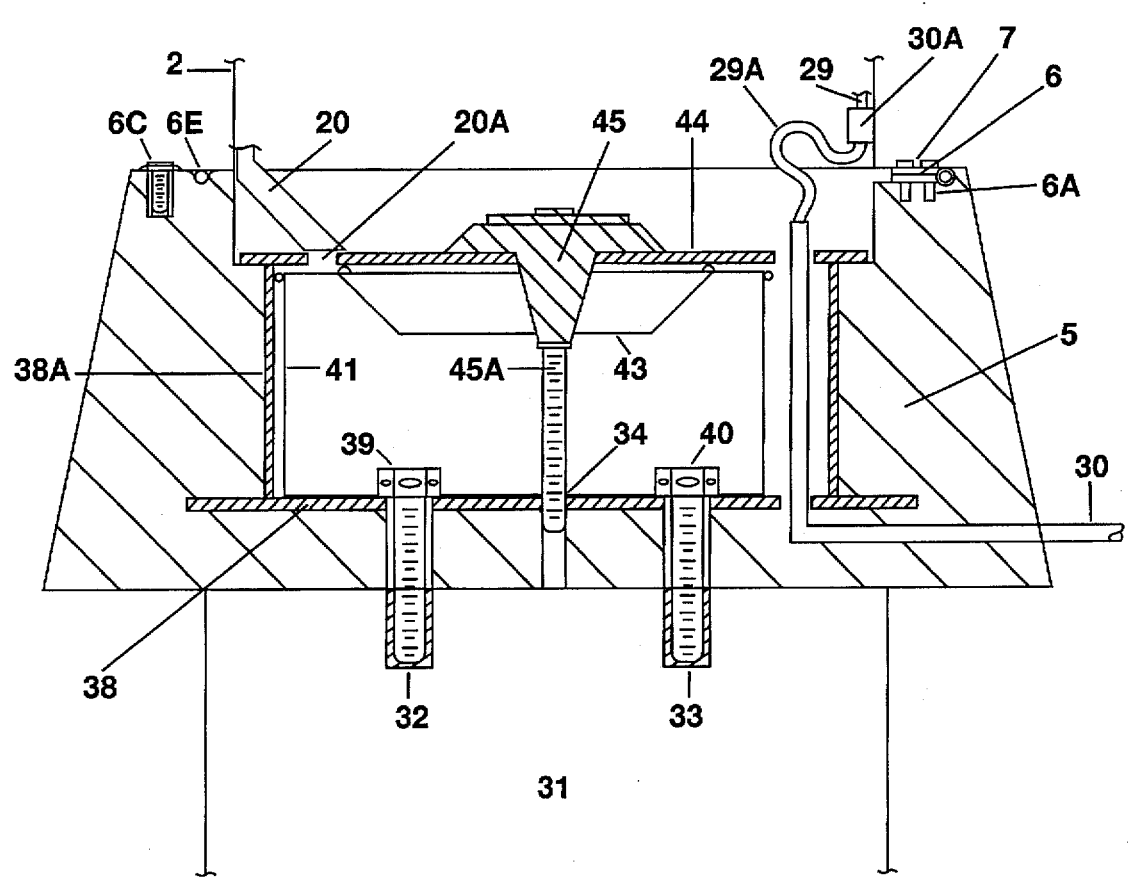
Figure 4:
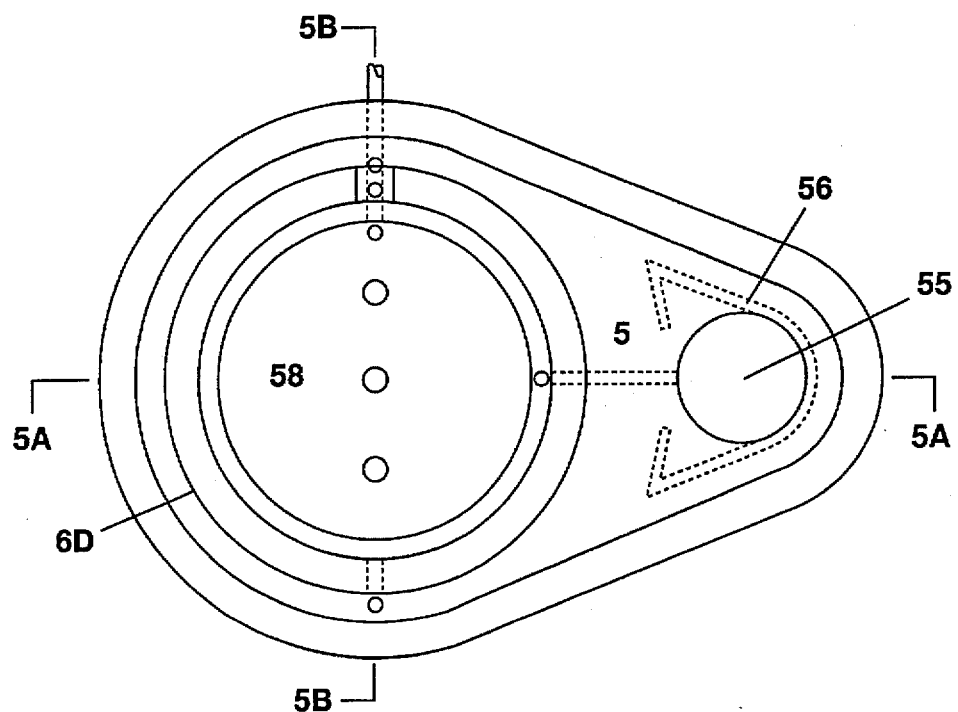
FIG. 4: Plan view of mounting base showing 5A—5A and 5B—B section index and showing oblong shape, recessed cavity, anchor holes, traffic guard post hole and steel strengthening strap.

Hinge 6, countersunk in base 5, to afford no profile to thieves, and bolted to lead anchors 6A and to external horizontal mounting flange 7 allows the enclosure machine section 2, when unlocked, to be tilted back for service access to hose reel and coin vault below. When the enclosure is closed bolt 6C is inserted and drawn down, pulling flange 7 of the enclosure tight onto the "O" ring 6E on top surface of base 5 thus creating a weather seal. With flange 7 pulled down on base 5, cam 6B of keyed lock 6A, FIG. 3A—A, engages base lock pin, not shown, to lock enclosure in closed position. (It is equally possible to bolt the enclosure in place, removing all but one bolt and swivel the enclosure horizontally off the base rather than raise it off on its hinges. While swivel is valid, the hinge technique affords certain advantages denied by the swivel technique. It is also possible, of course, to unbolt and lift the barrel off the base, but this too is less desirable than hinges)

Figure 5A:
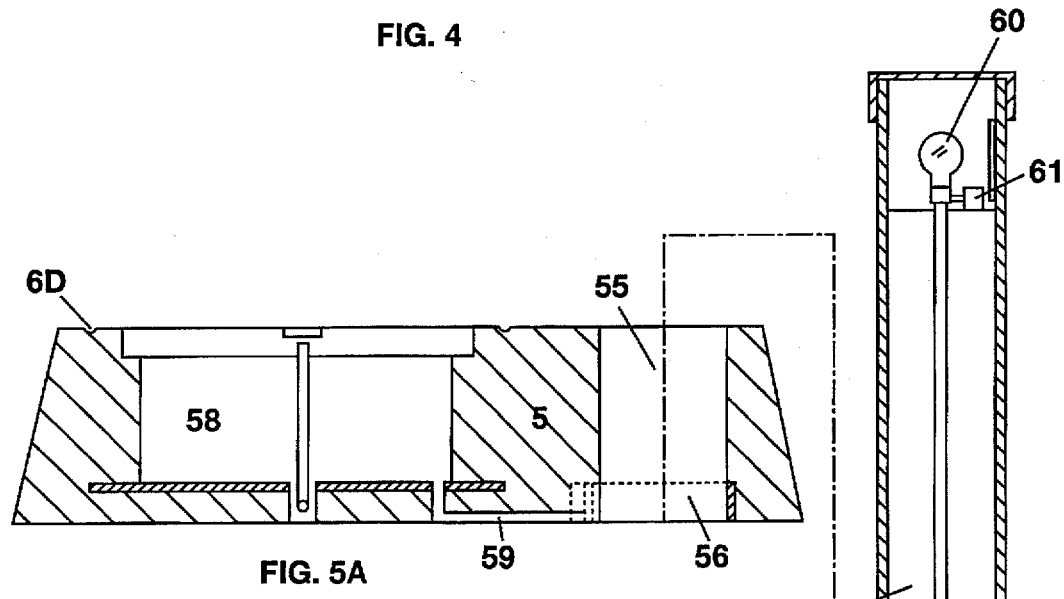
FIG. 5A: Elevation of section 5A—5A of mounting base.
Figure 5B:
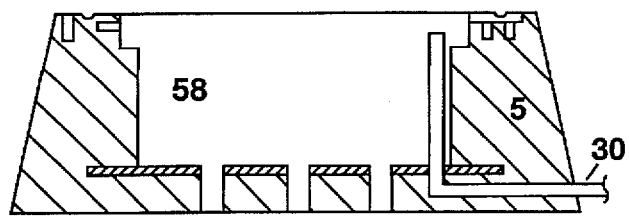
FIG. 5B: Elevation of section 58—58 of mounting base.
Figure 6:
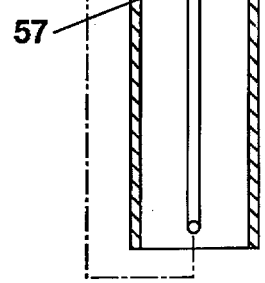
FIG. 6: Elevation of cutaway section of steel traffic guard post showing flood light and photo-electric switch.

Steel cylindrical sleeve 38A is inserted in vault cavity 58, see FIG. 5A, on top of steel plate 38. Removable coin box 41 is inserted in steel sleeve 38. Coin box handy lifting wires 43 fold down into box when not in use. Steel coin vault cover 44 is placed on top of steel sleeve 38 enclosing removable coin box. Cover 44 with attached "T handle" lock 45 is positioned such that coin slot 20A is directly under coin chute 20 so as to catch falling coins and direct them into the coin box below.

Threaded locking bolt 45A of "T Handle" lock 45 inserted thru hole in bottom of coin box into threaded hole 34 in steel bottom plate, is drawn tight and locked. The hinged machine enclosure is now swung over the coin vault assembly and locked in place with lock 6A.

FIGS. 5 THRU 6:

Concrete base 5 is oblong in front to house concrete-filled steel traffic guard post 57 as a protection against poor drivers. When the base has been positioned at job site post 57 is inserted in hole 55. Steel strap 56 is embedded in the concrete base when poured to help strengthen the concrete in tension against a frontal assault on the traffic guard post. For some very high traffic locations the mounting base is poured not in oblong but in a triangle shape to house two traffic guard posts. Additionally the entire concrete base is liberally laced with re-inforcing wire and shredded fibre glass, not shown, to strengthen base and to frustrate thievery. Circular groove 6D in top surface of base 5 accommodates rubber "O" ring 6E.

Electric conduit 59 runs from recessed cavity 58 through base 5 to center of post receptical 55. Wide angle flood light 60 positioned at top of traffic guard post 57 facing work area is energized during compressor run cycle and further controlled to dark hours by photo-electric switch 61.

I claim:

1. A coin operated automobile tire inflater apparatus comprising a weather protective apparatus vertical enclosure with internally mounted air compressor, hose reel and reel retractor spring electrical controls, coin acceptor mechanism, coin storage vault and apparatus reinforced concrete mounting base having:

means for hinged lockable service access to compressor and electrical controls and to hose reel and coin vault, means for compressor quick change and vibration isolating suspension, means for customer electric shock protection, means for maximizing coin and apparatus anti-theft security, means for protecting apparatus against auto impact, and means for attracting, advising and assisting user customers.

2. An apparatus as recited in claim 1, wherein said weather protective apparatus enclosure comprises a virtually immaculate vertical enclosure having surrounding internal horizontal flange at top and surrounding external horizontal mounting flange at bottom, having apparatus enclosure top cover with overhanging vertical rain protection sides, having weather gasket between surface of external horizontal mounting flange and said apparatus mounting base, and an air hose exit weather sealed by a ball-type hose retractor stop, said ball-type hose retractor-stop is pulled tight against the air hose exit by a reel retractor spring biased to retract the air hose when the machine is not in use.

3. An apparatus as recited in claim 1, wherein said means for hinged lockable hose reel and coin vault service access comprises one leg of a hinge assembly fixedly attached to underside of an apparatus enclosure external horizontal flange and second leg of hinge assembly fixedly attached in recessed notch to top of said apparatus mounting base, hinge pin away from enclosure, said enclosure having keyed lock including catch cam fixedly attached to and through bottom of vertical side diametrically opposing hinge assembly, said lock catch-cam, when locked, engaging an internal lock pin fixedly attached to apparatus mounting base.

4. An apparatus as recited in claim 2, wherein said means for lockable compressor and electric controls service access comprises one leg of a hinge assembly fixedly attached to inside of and at bottom of one side of an apparatus enclosure top cover and other leg of hinge assembly fixedly attached to outside of and at top of apparatus vertical enclosure, both hinge legs oriented upward from hinge pin, said top cover having keyed lock including catch cam fixedly attached to and through top cover at point diametrically opposing hinge assembly, said lock catch-cam, when locked, engaging slot in said enclosure horizontal internal top flange.

5. An apparatus as recited in claim 1, wherein said compressor quick change and vibration isolating suspension means comprises two vertical pins mounted on an apparatus internal horizontal flange at diametrically opposing points over said vertical pins are mounted rubber pillows and on said pillows are mounted opposite ends of flexible steel bar from which the air compressor is suspended, said steel bar having a compressor lift-out hand grip.

6. An apparatus as recited in claim 1, wherein said electrical shock protection means comprises firstly a dielectric male-to-female air hose union affixed between conventional hose reel metal air hose connection and conventional steel braided air hose, and secondly, a ground fault circuit breaker mounted up stream of all electrical operated devices.

7. An apparatus as recited in claim 1, wherein said means for maximizing coin and apparatus anti-theft security comprises a conventional coin acceptor mechanism fixedly attached high on internal vertical wall of apparatus enclosure, a metal drop chute to coin vault, said chute fixedly attached to inside wall of apparatus enclosure directly under acceptor, said coin vault comprising an internal cavity in said re-inforced concrete apparatus mounting base, bottom of said cavity comprised of horizontal steel plate peripherally embedded in the concrete walls of the cavity and upon which rests a vertical steel-sided sleeve, said sleeve dimensioned to fit the dimensions of said internal cavity and topped by removable horizontal steel vault cover plate, said steel cover plate affixed with "T handle" lock, threaded locking bolt of said "T handle" lock extending down from steel cover plate to engage threaded hole in steel bottom plate, said steel bottom plate also having mounting base anti-theft anchor bolt holes and water drain holes extending thru said bottom plate and re-inforced concrete below it, said steel vault supplemented with internal removable coin box, said removable coin box having two bent-wire lifting handles.

8. An apparatus as recited in claim 1, wherein said means for protecting the apparatus against auto impact comprises an extension of apparatus re-inforced concrete mounting base in direction from which traffic is to come, said extension having a vertical receptacle into which a substantial concrete-filled steel traffic guard post is fixedly inserted, said re-inforced concrete mounting base having a "U" shaped metal re-inforcing bar, a portion of each of the two legs of the "U" bent at 110 degree angle in direction of each other, said "U" bar positioned horizontally at bottom of post receptacle when concrete base is poured such that said "U" bar is wrapped around bottom end of traffic guard post when post inserted.

9. An apparatus as recited in claim 1, wherein said means for attracting, advising and assisting user customers comprises an apparatus enclosure top cover having on topmost outside surface fixedly attached light emitting diodes and high intensity flashing strobe light with power leads penetrating top cover to light controls fixedly attached to underside of top cover, and a concrete-filled traffic guard post fitted at top with a work-area floodlight controlled by photo-electric switch and compressor run circuit.

* * * * *